United States Patent
Tang

(10) Patent No.: US 9,202,321 B2
(45) Date of Patent: Dec. 1, 2015

(54) MULTI-CAMERA VEHICULAR IMAGE RECORDER

(75) Inventor: Chao-Lin Tang, Miaoli (TW)

(73) Assignee: Interactive Video Solutions, Inc., Newton, AL (US)

( * ) Notice: Subject to any disclaimer, the term of this patent is extended or adjusted under 35 U.S.C. 154(b) by 835 days.

(21) Appl. No.: 13/526,621

(22) Filed: Jun. 19, 2012

(65) Prior Publication Data

US 2013/0335568 A1 Dec. 19, 2013

(51) Int. Cl.
*H04N 7/18* (2006.01)
*G07C 5/08* (2006.01)
*H04N 5/77* (2006.01)
*H04N 5/225* (2006.01)

(52) U.S. Cl.
CPC ............ *G07C 5/0858* (2013.01); *G07C 5/0866* (2013.01); *H04N 5/2252* (2013.01); *H04N 5/2259* (2013.01); *H04N 5/772* (2013.01)

(58) Field of Classification Search
CPC ...................................................... H04N 5/76
See application file for complete search history.

(56) References Cited

U.S. PATENT DOCUMENTS

| | | | |
|---|---|---|---|
| 8,036,714 B2* | 10/2011 | Kwon et al. | 455/566 |
| 8,411,165 B2* | 4/2013 | Ozawa | 348/231.4 |
| 2012/0063737 A1* | 3/2012 | Gregoire | 386/224 |

* cited by examiner

*Primary Examiner* — Geepy Pe
*Assistant Examiner* — Joseph Becker
(74) *Attorney, Agent, or Firm* — The Weintraub Group, P.L.C.

(57) ABSTRACT

A multi-camera vehicular image recorder has a hollow body and a first image capturing module and a second image capturing module mounted in the body. The body has a first lens opening and a second lens opening formed through a front cover thereof. A lens of the first image capturing module is pivotally oscillated up and down within the first lens opening. The second image capturing module is fixed to be adjacent to the second lens opening. The body further has a third lens opening formed through a rear cover thereof. A third image capturing module is pivotally oscillated up and down within the first lens opening. As the first image capturing module is pivotable upwards and downwards, a view angle images taken by the first image capturing module is broader in collaboration with the second image capturing module and more complete driving conditions can be captured and provided.

9 Claims, 8 Drawing Sheets

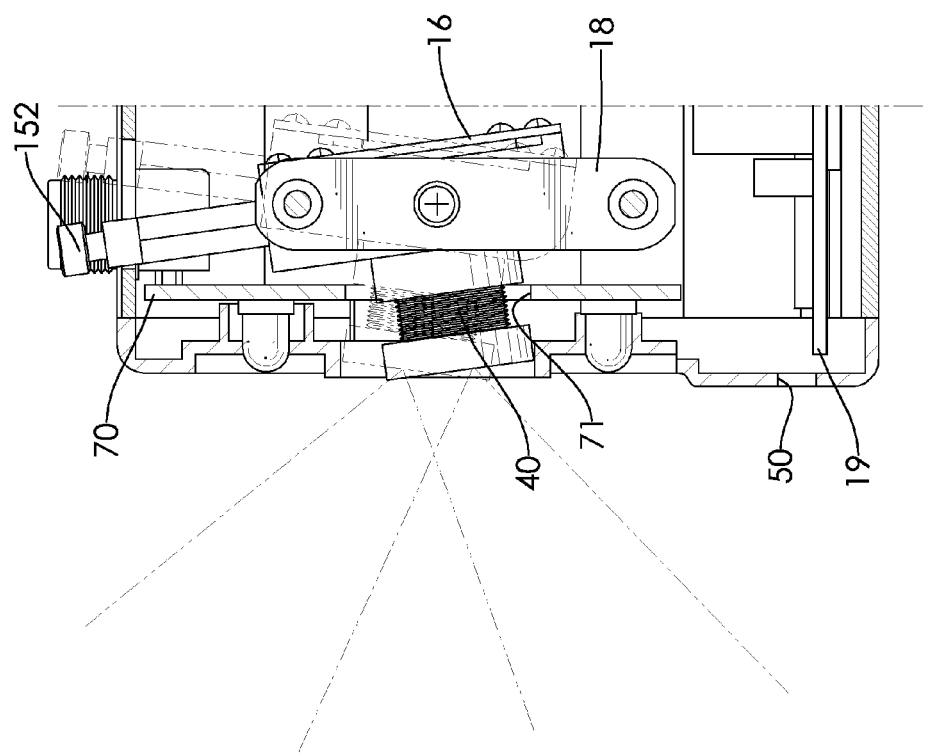

MULTI-CAMERA VEHICULAR IMAGE RECORDER

BACKGROUND OF THE INVENTION

1. Field of the Invention

The present invention relates to a vehicular image recorder and more particularly to a multi-camera vehicular image recorder having an adjustable camera angle.

2. Description of the Related Art

The historical development of moving picture cameras can be traced back quite some time ago, to the early film cameras, which are gradually evolved to the latest digital video cameras and recorders. Such development also resulted in camera downsizing and improved the portability thereof. In consideration of safety surveillance, cameras, such as drive recorders, may be applied to record for evidence collection or restoration of truth, ensuring that safety or personal rights or other concerns are not jeopardized for lack of solid evidence and mutual understanding.

Drive recorders in the current market taking the form of a small camera are dedicated to fulfilling the need of safety surveillance. When a traffic violation occurs, or when a traffic accident occurs between two or more drivers, the liability of each involved party is difficult to be determined and/or proven due to insufficient evidence on the spot. This is why drive recorders are brought into play and gain popularity among many drivers, including police cruiser use.

Most of the current drive recorders pertain to single-view image recorders. In other words, the view angles of the cameras of the drive recorders are fixed and only specific view angles are allowed. When the view angles of the cameras are oriented to their extreme corners, unclear and low quality images are inevitable. To cope with this circumstance, some users adjust the camera angles, upwardly, so that recorded images above the line of sight of the driver's will be recorded by the video recorders. However, such adjustment of the view angle makes it impossible to capture images or video as seen from the driver's normal line of sight. This makes it impossible to record video of objects directly in front of the vehicle. In addition, some cameras require that the driver adjust the zoom or magnification or angle on the camera lens to capture images of objects or other vehicles near the equipped vehicle. This is a distraction to the driver and cannot be done safely while in motion and causes the driver to interact with the camera system to record high quality video or images when not in motion. Drivers may not have time to adjust these cameras, particularly in situations of police cruiser use.

SUMMARY OF THE INVENTION

An objective of the present invention is to provide a multi-camera vehicular image recorder having a lens with an adjustable view angle to achieve a broader range of view angle and capture more driving conditions, without requiring driver involvement in adjustments. The multi camera invention provides two simultaneously recorded images or video, one of which displays a wide angle view of the roadways and conditions, mimicking the normal driver's line of sight, and one that displays a closer view in front of the vehicle, thereby capturing the required views without driver involvement or adjustment. In addition, this invention also simultaneously records video and images and audio of the interior, passengers, and contents of the vehicle.

To achieve the foregoing objective, the multi-camera vehicular image recorder has a body, at least one fixing frame, at least one camera holder, a first image capturing module and a second image capturing module.

The body is hollow and has a first lens opening and a second lens opening formed through a front of the body.

The at least one fixing frame is mounted inside the body.

Each one of the at least one camera holder is pivotally mounted on a corresponding fixing frame.

The first image capturing module is securely mounted inside a corresponding camera holder and is adjacent to the first lens opening.

The second image capturing module is securely mounted on a corresponding fixing frame and is adjacent to the second lens opening.

The first image capturing module is securely mounted inside the corresponding camera holder and the camera holder is pivotally mounted on the corresponding fixing frame so that the first image capturing module is pivotable with respect to the fixing frame through the camera holder. The pivotable first image capturing module provides a wider range of view angle in collaboration with the stationary second image capturing module as provided conventionally so as to capture and provide more complete driving information and ensure higher driving safety.

Other objectives, advantages and novel features of the invention will become more apparent from the following detailed description when taken in conjunction with the accompanying drawings.

BRIEF DESCRIPTION OF THE DRAWINGS

FIG. 8 is a third enlarged operational side view in partial section of the multi-camera vehicular image recorder in FIG. 5.

DETAILED DESCRIPTION OF THE INVENTION

Figure 1:
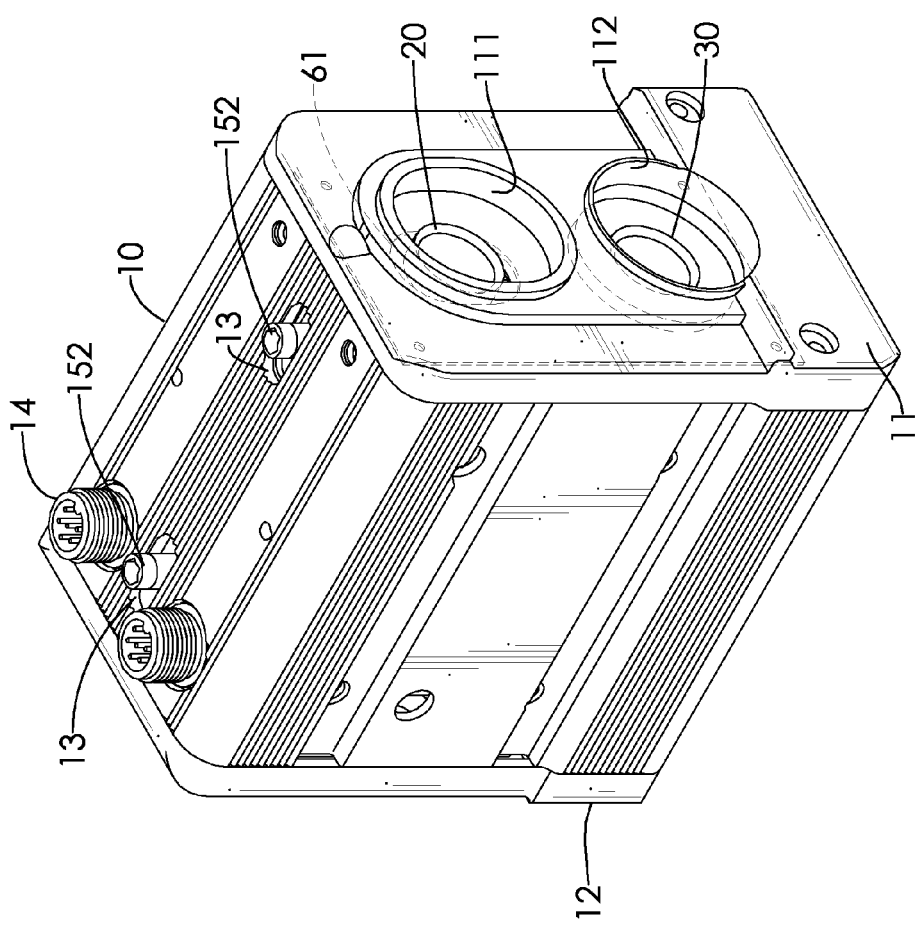
FIG. 1 is a perspective view of a multi-camera vehicular image recorder in accordance with the present invention.
Figure 2:
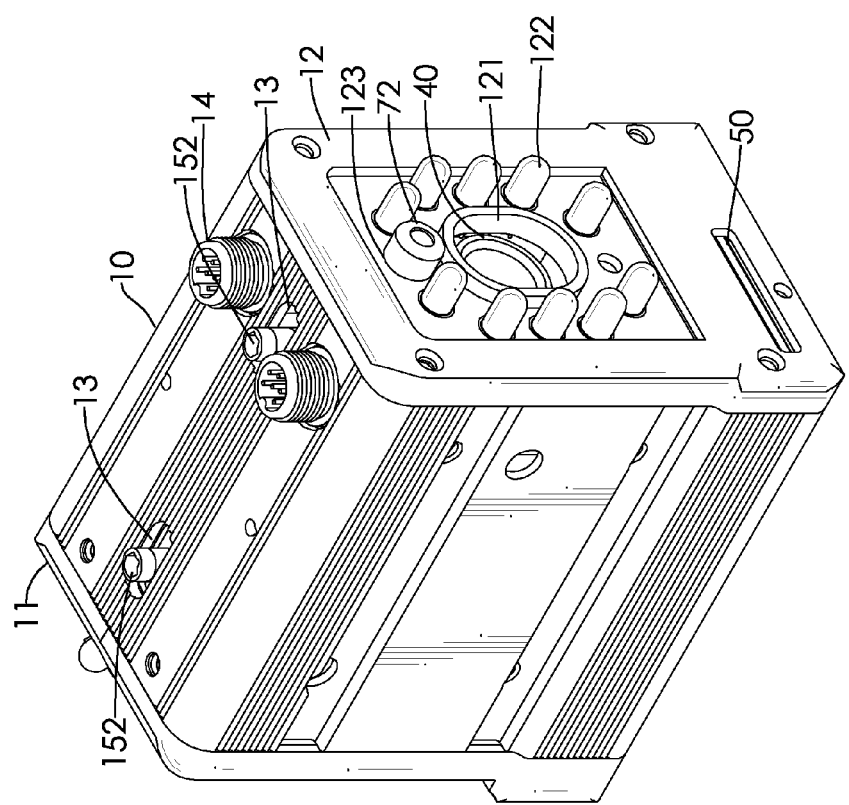
FIG. 2 is another perspective view of a multi-camera vehicular image recorder in accordance with the present invention.
Figure 3:
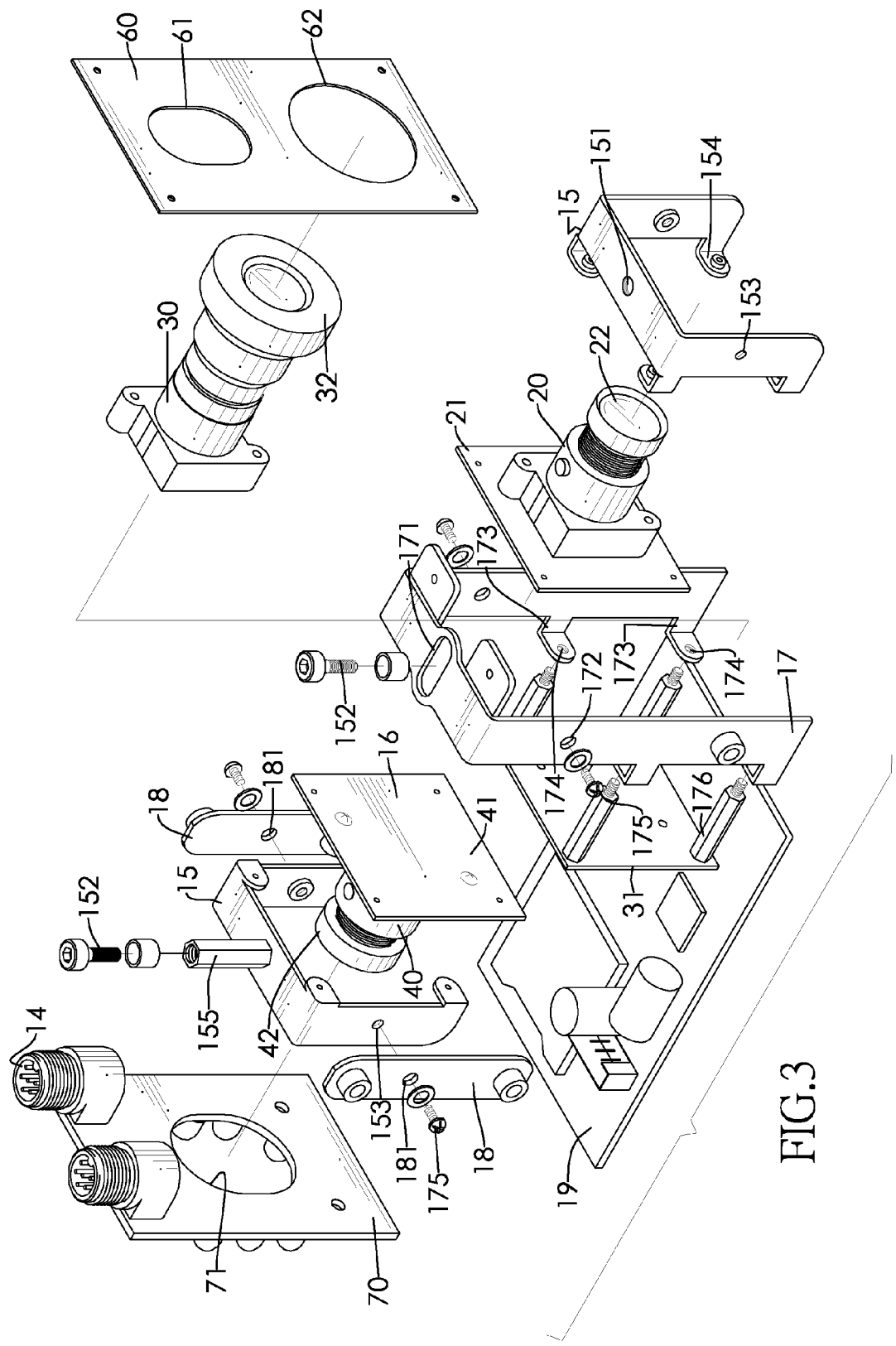
FIG. 3 is a partially exploded perspective view of the multi-camera vehicular image recorder in FIG. 1.

With reference to FIGS. 1 to 3, a multi-camera vehicular image recorder has a body 10, a front blocking board 60, a rear blocking board 70, two camera holders 15, a front fixing frame 17, a rear fixing frame 18 and a control substrate 19.

The body 10 is hollow and has a front cover 11, a rear cover 12 and two longitudinal holes 13. The front cover 11 is mounted on a front side of the body 10 and has a first lens opening 111 and a second lens opening 112 formed through the front cover 11. The first lens opening 111 is located above the second lens opening 112. The rear cover 12 is mounted on a rear side of the body 10 and has a third lens opening 121, multiple infrared light holes 122 and a sound receiving hole 123. The third lens opening 121 is formed through the rear cover 12. The infrared light holes 122 are formed through the rear cover 12 and around the third lens opening 121. The sound receiving hole 123 is formed through the rear cover 12. The two longitudinal holes 13 are formed through a top of the body 10 and are respectively adjacent to the front cover 11 and the rear cover 12.

The front blocking board 60 is mounted inside the body 10, is adjacent to the front cover 11, and has a first lens limiting hole 61 and a second lens limiting hole 62. The first lens limiting hole 61 is formed through the front blocking board 60 to correspond to the first lens opening 111 of the body 10. The second lens limiting hole 62 is formed through the front blocking board 60 to correspond to the second lens opening 112 of the body 10.

The rear blocking board 70 is mounted inside the body 10, is adjacent to the rear cover 12, and has a third lens limiting hole 71, multiple infrared light sources 73, a microphone 72 and two connectors 14. The third lens limiting hole 71 is formed through the rear blocking board 70 to correspond to the third lens opening 121. The infrared light sources 73 are mounted on a rear side of the rear blocking board 70, are mounted through and protrude beyond the respective infrared light holes 122 to provide the lighting in the dark for image recording, and may be infrared light-emitting diodes. The microphone 72 is mounted on the rear side of the rear blocking board 70, and is mounted through and protrudes beyond the sound receiving hole 123 for sound recording. The two connectors 14 are mounted on a front side of the rear blocking board 70 and are mounted through the top of the body 10 to serve to transmit images taken by the multi-camera vehicular image recorder to an external digital video recorder (DVR).

The two camera holders 15, the front fixing frame 17, the rear fixing frame 18 and the control substrate 19 are mounted inside the body 10. The camera holders 15 are mounted inside the body 10 and are respectively adjacent to the front cover 11 and the rear cover 12. Each camera holder 15 takes an inverted-U shape and has a top bar, two side legs, an adjustment hole 151, two pivot holes 153 and two extension arms. The adjustment hole 151 is formed through the top bar of the camera holder 15 for an adjustment rod 152 to be mounted therethrough. The adjustment rod 152 is further mounted through and retained within one of the longitudinal holes 13 of the body 10. The two pivot holes 153 are respectively formed through the two side legs of the camera holder 15. Each extension arm is formed on and protrudes inwardly from a bottom end of one of the side legs, is L-shaped, and has a fixing hole 154 formed through a free end of the extension arm.

In the present embodiment, the multi-camera vehicular image recorder further has three image capturing modules, namely a first image capturing module 20, a second image capturing module 30 and a third image capturing module 40. The first, second and third image capturing modules 20, 30, 40 are partially mounted in the first, second and third lens openings 111, 112, 121 and each of the first, second and third image capturing modules 20, 30, 40 has a circuit board 21, 31, 41 and a lens 22, 32, 42 mounted on the circuit board 21, 31, 41. Each circuit board 21, 31, 41 has a CCD sensing chip mounted thereon and corresponding to one of the lens 22, 32, 42. The lens 22 of the first image capturing module 20 is a focus-adjustable lens. The lens 32 of the second image capturing module 30 is a telephoto lens. The lens 42 of the third image capturing module 40 is a night view lens. The circuit boards 21, 41 of the first and third image capturing modules 20, 40 are fixed on the respective camera holders 15. The circuit board 31 of the second image capturing module 30 is securely mounted on the front fixing frame 17 by using multiple threaded pins 176. Each threaded pin 176 has a threaded end engaging the front fixing frame 17 and a threaded hole formed in the other end of the threaded pin 176 and serving for engaging the circuit board 31.

The front fixing frame 17 also takes an inverted-U shape and has a top bar, two side legs, an elongated hole 171, two pivot holes 172 and two extension arms 173. The elongated hole 171 is formed through the top bar of the front fixing frame 17 and corresponds to the longitudinal hole 13 of the body adjacent to the front cover 11. The two side legs of the front fixing frame 17 are respectively mounted on two opposite inner sides of the body 10. Each pivot hole 172 is formed through one of the side legs of the front fixing frame 17 and is adjacent to the top bar of the front fixing frame 17 for a pivoting screw 175 to be simultaneously mounted through the pivot hole 172 of the front fixing frame 17 and the pivot hole 153 of the corresponding camera holder 15 so that the camera holder 15 is pivotable with respect to the pivot holes 172 of the front fixing frame 17. Each extension arm 173 is formed on and protrudes inwardly from a bottom end of one of the side legs of the front fixing frame 17, is L-shaped, and has a fixing hole 174 formed through a free end of the extension arm 173 for engaging the threaded end of a corresponding threaded pin 176.

The rear fixing frame 18 differs from the front fixing frame 17 in having no top bar and has two side legs and two pivot holes 181. Two side legs of the rear fixing frame 18 are respectively mounted on the two opposite inner sides of the body 10. Each pivot hole 181 is formed through one of the side legs of the front fixing frame 17 for a pivoting screw 175 to be simultaneously mounted through the pivot hole 181 of the rear fixing frame 18 and the pivot hole 153 of the corresponding camera holder 15 so that the third image capturing module 40 is pivotable with respect to the pivot holes 181 of the rear fixing frame 18.

Figure 4:
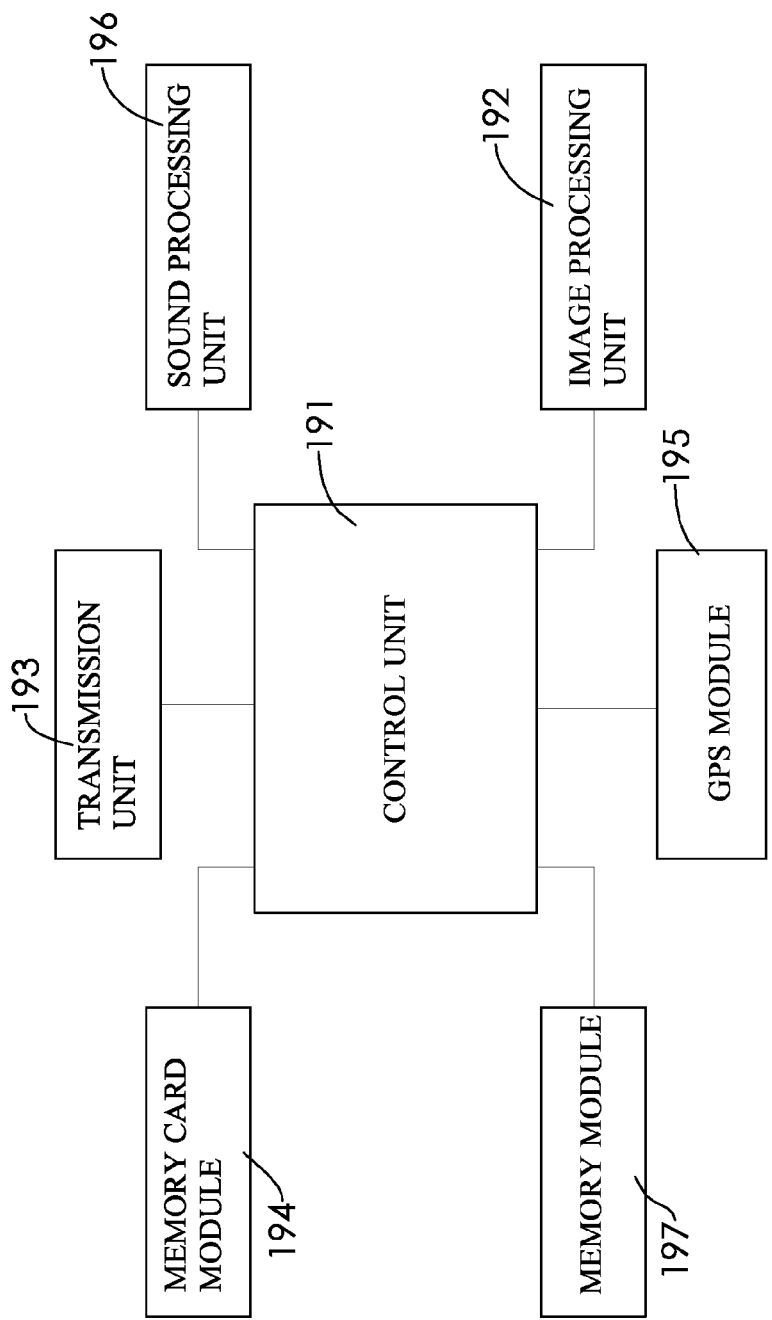
FIG. 4 is a functional block diagram of a control substrate of the multi-camera vehicular image recorder in FIG. 3.

The control substrate 19 is mounted on an inner bottom of the body 10. With reference to FIG. 4, the control substrate 19 has a control unit 191, an image processing unit 192, a transmission unit 193, a memory card module 194, a global positioning system (GPS) module 195, a sound processing unit 196 and a memory module 197. The transmission unit 193 is electrically connected with the connectors 14. The memory card module 194 is a rectangular memory card socket for all types of memory cards to be inserted therein. The memory cards may store navigation information associated with maps. The GPS module 195 serves to access the navigation information stored in the memory cards. The sound processing unit 196 is electrically connected to the microphone mounted inside the sound receiving hole 123 to convert analog signals received from the microphone into digital signals and then transmit the digital signals to the control unit 191. The memory module 197 stores built-in information for communicating with an external DVR. The image processing unit 192 acquires analog video signals from each image capturing module 20, 30, 40, converts the analog video signals into digital image signals and transmits the digital image signals to the control unit 191 and further to an external DVR through the connectors 14.

The lens 22 of the first image capturing module 20 is located between the first lens limiting hole 61 of the front blocking board 60 and the first lens opening 111, and is pivotable within a range limited by the first lens limiting hole 61 of the front blocking board 60 for adjusting its view angle when the adjustment rod 152 within the longitudinal hole 13 in the front of the top of the body 10 is shifted forwards and backwards.

The lens 32 of the second image capturing module 30 is located inside the second lens opening 112 of the front cover 11.

The lens 42 of the third image capturing module 40 is located inside the third lens opening 121.

In the present embodiment, the third lens opening 121 is relatively lower than the first lens opening 111. An extension rod 155 is further mounted in the adjustment hole 151 of the camera holder 15 adjacent to the rear cover 12 for the adjustment rod 152 to be inserted in the extension rod 155. By shifting the adjustment rod 152 within the longitudinal hole 13 in the rear forwards and backwards, the third image capturing module 40 is pivotable within a range limited by the third lens limiting hole 71 of the rear blocking board 70 for adjusting its camera angle.

The rear cover 12 further has a memory card slot 50 formed therethrough and aligns with the memory card module 194 of the control substrate 19 inside the body 10.

Figure 5:
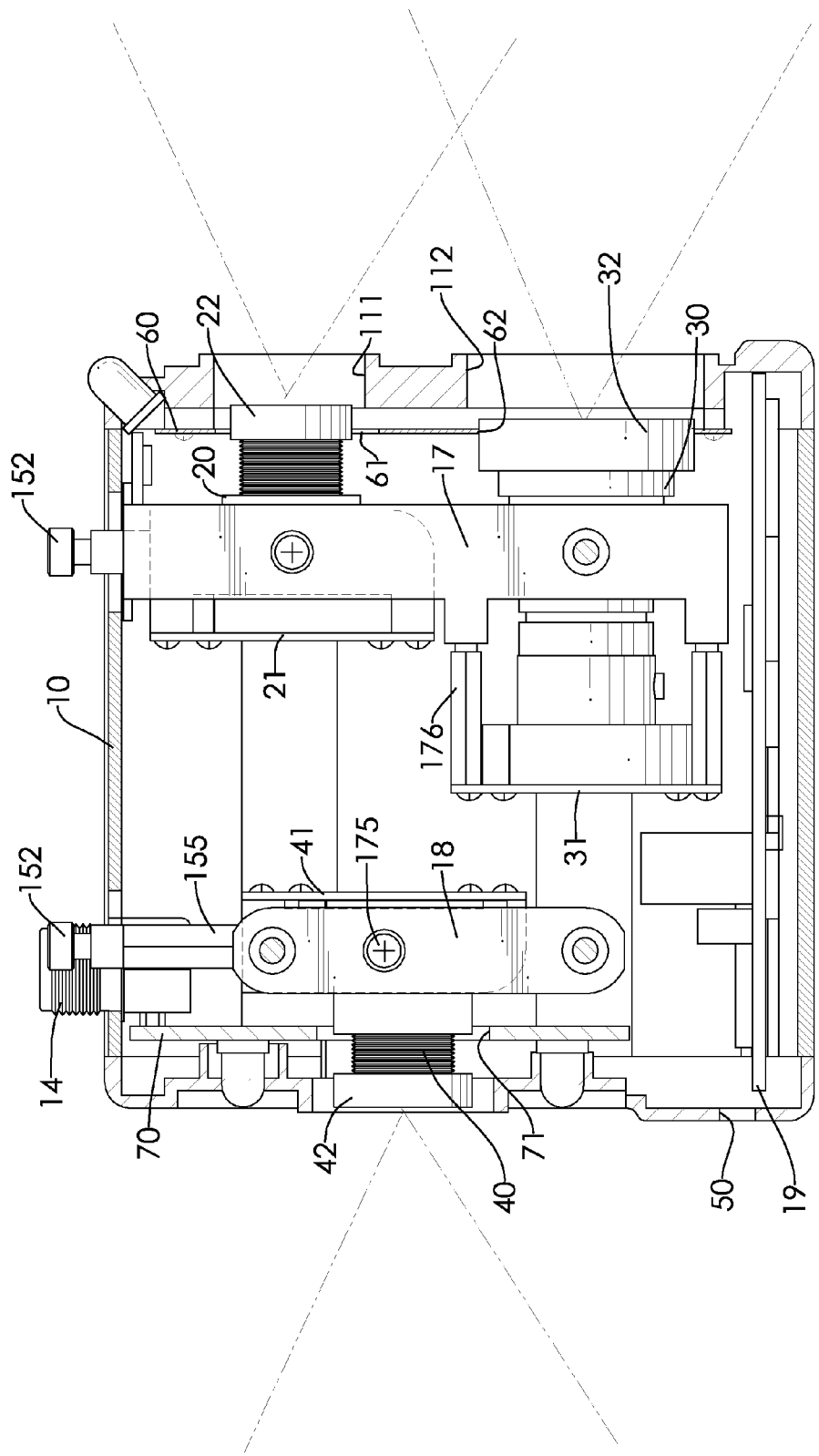
FIG. 5 is an operational side view in partial section of the multi-camera vehicular image recorder in FIG. 1.
Figure 6:
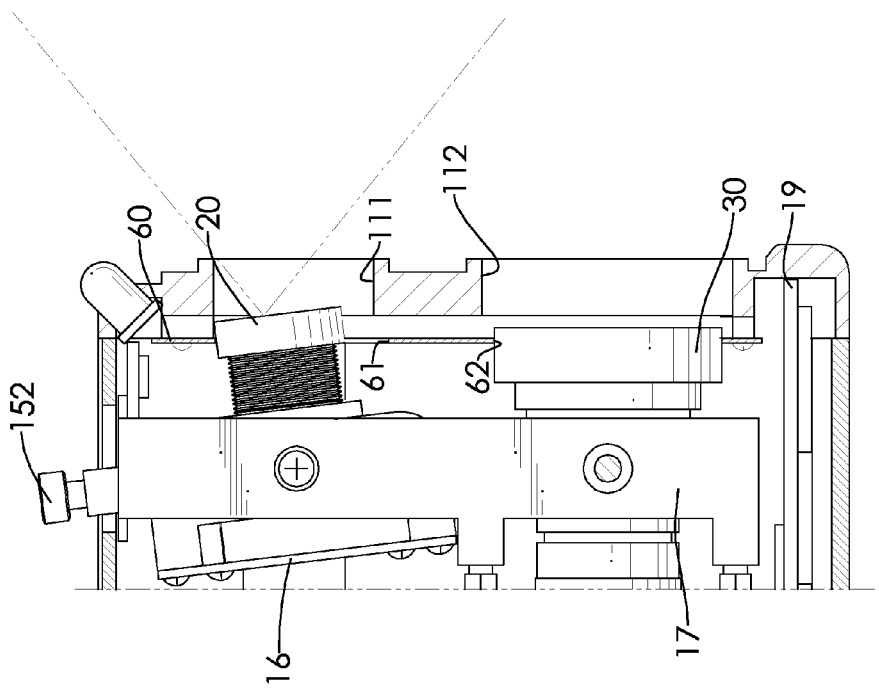
FIG. 6 is a first enlarged operational side view in partial section of the multi-camera vehicular image recorder in FIG. 5.
Figure 7:
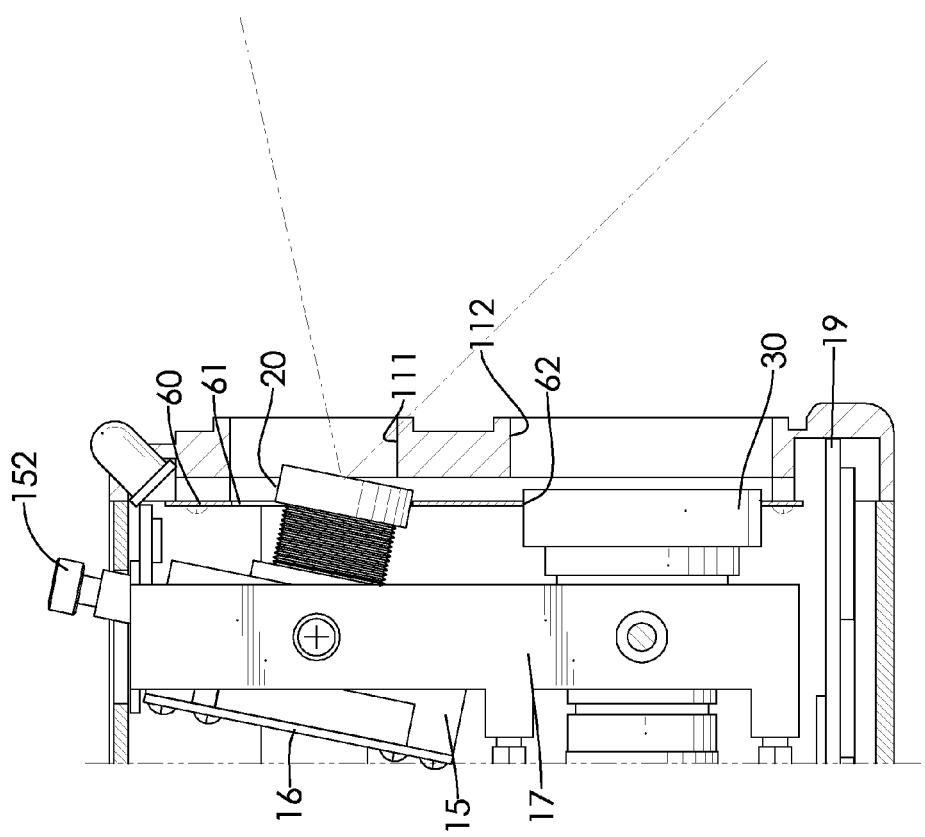
FIG. 7 is a second enlarged operational side view in partial section of the multi-camera vehicular image recorder in FIG. 5.

The multi-camera vehicular image recorder constructed based on the foregoing structure employs the first image capturing module 20 having the focus-adjustable lens 22 in collaboration with the second image capturing module 30 having the telephoto lens 32 to record the driving condition in front of the vehicle, and the third image capturing module 40 having the night view lens 42 to record the passengers on the backseat or the driving condition behind the vehicle. The feature of recording the passengers on the backseat is mainly equipped in a police vehicle for keeping track of the move of the prisoner on the backseat. As pivotally mounted on the front fixing frame 17, the first image capturing module 20 is oscillated forwards and backwards by the shifting of a corresponding adjustment rod 152 forwards and backwards in an adjustment hole 151. With reference to FIG. 5, when the multi-camera vehicular image recorder is operated, the first image capturing module 20 and the second image capturing module 30 record the driving condition in front of the vehicle along two respective view angles, while the third image capturing module 40 records the passengers on the backseat. As the first and second image capturing modules 20, 30 record the driving condition in front of the vehicle and their view angle ranges are respectively located in the upper front portion and lower front portion relative to each other, a total view angle range is broader than those of the conventional single-view vehicular image recorders. With reference to FIG. 6, when the corresponding adjustment rod 152 is shifted backwards, the first image capturing module 20 having the focus-adjustable lens 22 can be oriented upwards to extend the view angle of the first image capturing module upwards. With reference to FIG. 7, when the adjustment rod 152 is shifted forwards, the first image capturing module 20 can be oriented downwards to extend the view angle of the first image capturing module downwards and focus on the ground in front of the vehicle, so that those blocked portions in the lower front of the vehicle are also within a recordable range. With reference to FIG. 8, similar to the first image capturing module 20, the third image capturing module 40 can be oscillated upwards and downwards for a desired view angle thereof.

In sum, as the first image capturing module 20 is pivotable and has the focus-adjustable lens 22, the total view angle range can be enlarged to provide road users with relatively more complete driving conditions.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A multi-camera vehicular image recorder comprising:
   (a) a hollow body, the hollow body including a top and two longitudinal holes formed through the top of the hollow body, the body, further including: (i) a first lens opening; (ii) a second lens opening, and (iii) a third lens opening,
   (b) a fixing frame mounted within the hollow body adjacent to the second lens opening;
   (c) a front cover, the first lens opening and the second lens opening being formed through the front cover;
   (d) a rear cover, the third lens opening provided in the rear cover, the rear cover further including a sound receiving hole;
   (e) a front blocking board mounted inside the hollow body adjacent the front cover, the front blocking board having a first lens limiting hole formed therein corresponding to the first lens opening;
   (f) a rear blocking board including a third lens limiting hole corresponding to the third lens opening;
   (g) a microphone mounted on a rear side of the rear blocking board, and mounted through and protruding beyond the sound receiving hold in the rear cover;
   (h) a pair of connectors mounted on a front side of the rear blocking board and extending through the to of the hollow body;
   (i) two camera holders, the two holders being pivotally mounted on the fixing frame; and located, respectively, adjacent to the front cover and the rear cover, each of the holders having (i) an inverted-U shape, (ii) a top bar and (iii) two side legs, each side leg includes (a) an adjustment hole formed through each camera holder (b) an adjustment rod mounted through the adjustment hole, the adjustment rods being further mounted through and retained within one of the longitudinal holes of the body, (c) two pivot holes formed through the two side legs of each of the camera holders, (d) two L-shaped extension arms, each formed on and protruding inwardly from a bottom end of one of the side legs, and having a fixed hole formed through a free end of the extension arm (e) a control substrate for each holder, each holder being attached to its associated substrate
   (j) a first image capturing module securely mounted inside a corresponding camera holder and being adjacent to the first lens opening and pivotable within a range limited by the first lens limiting hole of the front blocking board; and
   (k) a second image capturing module securely mounted on a corresponding fixing frame and being adjacent to the second lens opening.
   (l) a third image capturing module mounted on the third lens opening, the third image capturing module being pivotable within a range limited by the third lens limiting hole of the rear blocking board, and wherein
   (m) each of the first, second and third image capturing modules, has a circuit board having a charge-couple device (CCD) sensing chip mounted thereon;
   (n) a lens mounted on each circuit board and corresponding to the CCD sensing chip, the circuit boards are respectively formed on a camera held adjacent to the first cover and the rear cover, and
further, wherein the lens of the first image capturing module is a focus-adjustable lens.

2. The multi-camera vehicular image recorder as claimed in claim 1, further comprising:

a front fixing frame being adjacent to the front cover, taking an inverted-U shape, and having:
  a top bar;
  two side legs mounted on two opposite inner sides of the body and pivotally mounted on the side legs of the camera holder adjacent to the front cover;
  an elongated hole formed through the top bar of the front fixing frame and corresponding to the longitudinal hole of the body adjacent to the front cover;
  two pivot holes, each formed through one of the side legs of the front fixing frame and being adjacent to the top bar of the front fixing frame for a pivoting screw to be simultaneously mounted through the pivot hole and the pivot hole of the corresponding camera holder;
  two extension arms, each formed on and protruding inwardly from a bottom end of one of the side legs of the front fixing frame, being L-shaped, and having a fixing hole formed through a free end of the extension arm; and
a rear fixing frame being adjacent to the rear cover.

3. The multi-camera vehicular image recorder as claimed in claim 2, further comprising two adjustment rods, wherein
one of the adjustment rods is mounted through the longitudinal hole of the body adjacent to the front cover, the elongated hole of the front fixing frame and the adjustment hole of the camera holder adjacent to the front cover and is retained in the longitudinal hole of the body adjacent to the front cover; and
the other adjustment rod is mounted through the longitudinal hole of the body adjacent to the rear cover and the adjustment hole of the camera holder adjacent to the rear cover.

4. The multi-camera vehicular image recorder as claimed in claim 1, wherein
the control substrate includes:
  a control unit;
  an image processing unit acquiring analog video signals from the first, second and third image capturing modules, converting the analog video signals into digital image signals and transmitting the digital image signals to the control unit and adapted to further transmit the digital image signals to an external DVR through the connectors;
  a transmission unit electrically connected with the connectors;
  a memory card module being a rectangular memory card socket for a memory card to be inserted therein, wherein the memory card stores navigation information associated with maps;
  a global positioning system (GPS) module serving to access the navigation information stored in the memory card module;
  a sound processing unit electrically connected to the microphone mounted inside the sound receiving hole to convert analog signals received from the microphone into digital signals and then transmit the digital signals to the control unit; and
  a memory module adapted to store built-in information for communicating with the external DVR.

5. The multi-camera vehicular image recorder as claimed in claim 2, wherein
the control substrate comprises:
  a control unit;
  an image processing unit acquiring analog video signals from the first, second and third image capturing modules, converting the analog video signals into digital image signals and transmitting the digital image signals to the control unit and adapted to further transmit the digital image signals to an external DVR through the connectors;
  a transmission unit electrically connected with the connectors;
  a memory card module being a rectangular memory card socket for a memory card to be inserted therein, wherein the memory card stores navigation information associated with maps;
  a global positioning system (GPS) module serving to access the navigation information stored in the memory card module;
  a sound processing unit electrically connected to the microphone mounted inside the sound receiving hole to convert analog signals received from the microphone into digital signals and then transmit the digital signals to the control unit; and
  a memory module adapted to store built-in information for communicating with the external DVR.

6. The multi-camera vehicular image recorder as claimed in claim 3, wherein
the control substrate includes:
  a control unit;
  an image processing unit acquiring analog video signals from the first, second and third image capturing modules, converting the analog video signals into digital image signals and transmitting the digital image signals to the control unit and adapted to further transmit the digital image signals to an external DVR through the connectors;
  a transmission unit electrically connected with the connectors;
  a memory card module being a rectangular memory card socket for a memory card to be inserted therein, wherein the memory card stores navigation information associated with maps;
  a global positioning system (GPS) module serving to access the navigation information stored in the memory card module;
  a sound processing unit electrically connected to the microphone mounted inside the sound receiving hole to convert analog signals received from the microphone into digital signals and then transmit the digital signals to the control unit; and
  a memory module adapted to store built-in information for communicating with the external DVR.

7. The multi-camera vehicular image recorder as claimed in claim 4, wherein the rear cover further has a memory card slot formed therethrough and aligning with the memory card module of the control substrate inside.

8. The multi-camera vehicular image recorder as claimed in claim 4, wherein the rear cover further has a memory card slot formed therethrough and aligning with the memory card module of the control substrate inside.

9. The multi-camera vehicular image recorder as claimed in claim 1, wherein the rear cover further has a memory card slot formed therethrough and aligning with the memory card module of the control substrate inside.

* * * * *